June 26, 1934.  P. M. FREER  1,964,568
PISTON
Filed Sept. 22, 1932
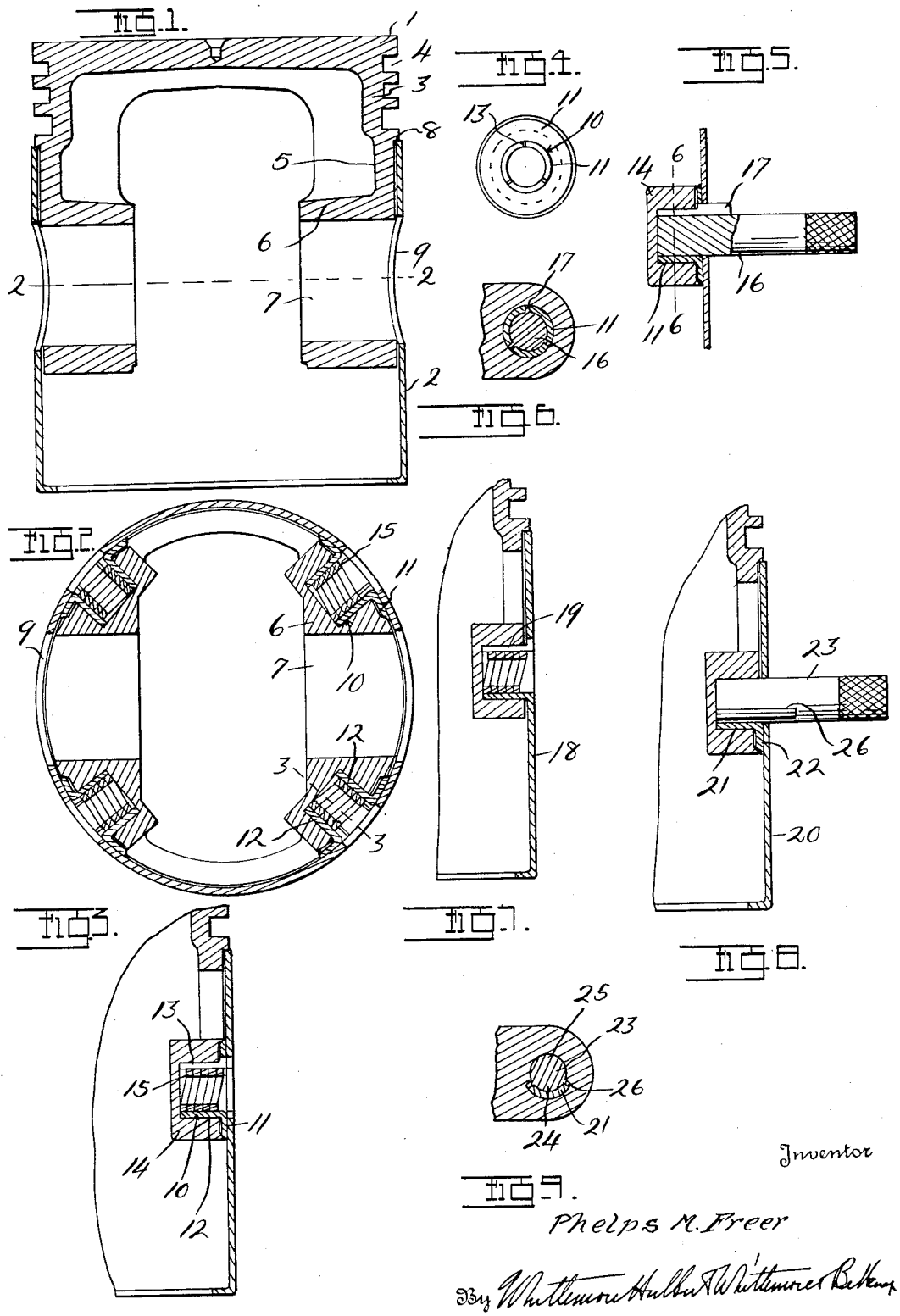
Inventor
Phelps M. Freer Patented June 26, 1934

1,964,568

UNITED STATES PATENT OFFICE 1,964,568

PISTON

Phelps M. Freer, Detroit, Mich.

Application September 22, 1932, Serial No. 634,409

10 Claims. (Cl. 309—15)

The invention relates to pistons and refers more particularly to composite pistons having separately formed heads and skirts. The invention has for some of its objects to provide an improved construction of piston which provides for unequal expansion and contraction of its head and skirt without affecting its operation; to provide an improved construction of piston in which the head and skirt are restrained from all relative movement other than in a radial direction; and to provide a piston which is so constructed that its head and skirt may be maintained in axial alignment without the necessity of maintaining exact locations of the bearings on the skirt for anchoring the head to the skirt. The invention has for another object to provide a simple and economical method of forming a composite piston having the above properties.

These and other objects of the invention will become apparent from the following description, taken in connection with the accompanying drawing, in which Figure 1 is a longitudinal section through a piston showing an embodiment of my invention;

Figure 2 is a cross section on the line 2—2 of Figure 1;

Figure 3 is a cross section on the line 3—3 of Figure 2;

Figure 4 is an inside end elevation of one of the skirt bearings;

Figure 5 is a section similar to that of Figure 3 showing one step in the method of manufacture;

Figure 6 is a cross section on the line 6—6 of Figure 5;

Figure 7 is a view similar to Figure 3 showing another embodiment of my invention;

Figure 8 is a view similar to Figure 3 showing another embodiment of my invention;

Figure 9 is a view similar to Figure 6 showing one step in the method of manufacture of the second embodiment of my invention.

The piston comprises the head 1 and the skirt 2, the former being preferably formed of a light metal, such as aluminum or aluminum alloy or magnesium or magnesium alloy, and being preferably out of engagement with the wall of the cylinder within which the piston operates and the latter being preferably formed of sheet metal and more particularly sheet steel and being adapted for engagement with the wall of the cylinder. The head 1 has the annular portion 3 which is provided with the annular grooves 4 for receiving the piston rings and also has depending from the annular portion the pair of diametrically opposite arcuate walls 5 which preferably decrease in width downwardly and further has the pair of diametrically opposite hubs 6 at the lower ends of the walls and provided with the axially aligned cylindrical bearings 7 for receiving the wrist pin which connects the piston to the connecting rod. The skirt 2 telescopes over the hubs 6 and the arcuate walls 5 and provides clearance between its inner face and the outer face of these hubs and walls. This skirt has its upper end below the annular shoulder 8 formed upon the head. This skirt is provided with the diametrically opposite openings 9 which are adapted to register with the bearings 7 and are of a size to permit passage therethrough of the wrist pin. The outer surface of the skirt may be and is preferably copper and tin plated to give the skirt good wearing properties.

To secure the head and skirt together, each is provided with angularly spaced bearings which are arranged in pairs. The bearings of each pair are nested or arranged in telescoping relation and furthermore they are yieldably forced toward each other to prevent any play longitudinally of the piston. However, these bearings are arranged to extend radially and the bearings of the head are movable relative to the bearings of the skirt, so that while the head and skirt are maintained concentric or with their axes coincident, relative expansion and contraction of the head and skirt may take place. In detail, the skirt has the angularly spaced tubular bearings 10 secured to its inner face and extending radially inwardly, the plane passing through the axes of these bearings also preferably passing through the axes of the bearings 7. These tubular bearings are formed of sheet metal and preferably sheet steel and each has at its outer end the annular flange 11 which is shaped to conform to the inner face of the skirt and which is fixedly secured against the inner face as by being annularly welded thereto. The periphery of the annular flange is bevelled. The tubular portion of each tubular bearing is longitudinally severed to form the longitudinally extending flexible sections or tongues 12, the severing in the present instance being accomplished by making the slots 13. The head is a casting and has the angularly spaced tubular bearings 14 each of which is continuous or endless and telescopically engages a tubular bearing 10. The bearings 14 are formed in the opposite sides of the hub 6. 15 are coil springs within the bearings 10, there being a coil spring for each bearing. These coil springs are under radial compression at all times during the operation of the piston and as a consequence yieldably and resiliently force the flexible sections or tongues 12 of the tubular bearings 10 toward the tubular bearings 14 to maintain the same in close engagement at all times, irrespective of the relative expansion and contraction of these bearings. The coil springs are each preferably provided with an inturned end and a shoulder at the opposite end for engagement with a suitable tool for winding up and contracting each coil spring and inserting the same into place through a hole in the body of the skirt registering with each tubular bearing 10.

In making the piston, the skirt is first suitably formed, as are also its tubular bearings 10. These bearings are then fixedly secured by annular welds to the inner face of the skirt in their proper positions. These bearings may also be formed integral with the body of the skirt by drawing operations. The skirt with its bearings is then placed in a mold which is preferably of the permanent type, after which the metal plugs 16 are inserted by a radially inward movement into the tubular bearings 10. These plugs are provided with the fins 17 which register with and completely fill the slots 13 in these tubular bearings and the inner ends of the plugs are preferably made flush with the inner ends of the tubular bearings. The necessary cores of the mold for forming the interior of the head and the wrist pin bearings are also inserted into place. The metal which forms the head is then poured, the mold and the skirt being at the proper temperatures to avoid chilling this metal to an extent preventing its proper flow. In this connection, the skirt may be heated prior to its insertion into the mold, if found necessary or desirable. After the molten metal has initially cooled and solidified to the desired extent the plugs 16 and the mold cores are withdrawn, so that upon further cooling of the metal forming the head its portions surrounding the bearings of the skirt shrink upon these bearings and contract the same, the slots of the bearings decreasing in width. The metal forming the head also shrinks and contracts away from the inner face of the skirt to provide clearance between its inner face and the outer faces of the hubs 6 and arcuate walls 5. Longitudinal shrinking of the metal forming the head and more particularly metal forming the hubs and arcuate walls of the head is provided for by reason of the skirt bearings being flexible and their annular flanges being bevelled at their peripheries. After the head is cast upon the skirt, the skirt bearings may then be drilled to make their radially inner faces cylindrical. Other machining operations, such as drilling the wrist pin holes to make the cylindrical bearings 7, may also be carried out at this time. Also the coil springs 15 while under radial compression are inserted into the tubular bearings 10.

In the modification shown in Figure 7, the skirt 18 is formed of cast metal, such as cast iron, and its tubular bearings 19 are cast integral therewith, the arrangement of these bearings being the same as that of the tubular bearings 10. However, these bearings 19 are made tubular by suitable drilling operations and formed with longitudinal slots by suitable broaching operations. The head of the piston may be formed in the same manner as above described with reference to Figures 1 to 6 inclusive, although it may be cast upon the head if desired without using plugs in the tubular bearings. If this is done, the metal of the head which enters the tubular bearings and their slots must be removed by suitable machining operations. Coil springs similar to the coil springs 15 resiliently retain the bearings of the skirt and head together.

Figures 8 and 9 disclose another modification in which the skirt 20 is preferably formed of sheet metal, such as sheet steel, and has secured to its inner face the arcuate bearings 21 which are in the nature of tongues and are also preferably formed of sheet metal, such as sheet steel. These bearings have at their inner ends the arcuate flanges 22 which are shaped to conform to the inner face of the skirt and are welded thereto. These bearings 20 may also be formed by striking the same out of the body of the skirt. Plugs 23 are associated with these arcuate bearings or tongues during the casting of the head upon the skirt and each plug has the minor portion 24 which fits the radially inner face of the arcuate bearing and the major portion 25 of the same radius, there being the longitudinally extending splines or ribs 26 between these portions and at the side edges of the arcuate bearings to maintain the metal forming the head out of contact with these side edges.

From the above description, it will be readily seen that I have provided a construction of composite piston in which the head and skirt are maintained in axial alignment and at the same time relative expansion and contraction of the head and skirt may take place without affecting the operation of the piston. It will also be seen that any relative movement of the head and skirt takes place in a radial direction and that the bearings of the head and skirt are maintained in close engagement at all times, irrespective of the relative expansion and contraction. It will further be seen that the construction of the piston is such and its method of manufacture is such that the piston may be manufactured at relatively low cost.

What I claim as my invention is:

1. In a piston, the combination with a skirt having angularly spaced bearings, of a head having cooperating angularly spaced bearings encircling and compressing and movable relative to said first mentioned bearings, and means for yieldably forcing said first mentioned bearings toward said second mentioned bearings.

2. In a piston, the combination with a head having angularly spaced radially extending tubular bearings, of a head having cooperating angularly spaced radially extending tubular bearings, said bearings of said head and skirt being arranged in pairs with the bearings of each pair in telescopic engagement, and means for yieldably forcing the bearings of each pair toward each other.

3. In a piston, the combination with a head having angularly spaced radially extending tubular bearings, of a head having cooperating angularly spaced radially extending tubular bearings, said bearings of said head and skirt being arranged in pairs, with the bearings of each pair in telescopic engagement, and resilient means for forcing said first mentioned bearings toward their respective bearings on said head.

4. In a piston, the combination with a skirt having angularly spaced radially extending tongues, of a head having cooperating angularly spaced radially extending bearings encircling and compressing and movably engaging said tongues, said head having a bearing for each tongue, and means for yieldably retaining said tongues in engagement with their respective bearings.

5. In a piston, the combination with a skirt having angularly spaced tubular bearings, of a head having cooperating angularly spaced bearings telscopically engaging said tubular bearings, and means for yieldably forcing said tubular bearings toward said second mentioned bearings.

6. In a piston, the combination with a skirt having angularly spaced radially extending flexible bearings, of a head having cooperating angularly spaced tubular bearings telescopically and movably engaging said flexible bearings.

7. In a piston, the combination with a skirt having angularly spaced radially extending flexible bearings, of a head having cooperating angularly spaced bearings nesting with said flexible bearings, and resilient means for retaining said first and second mentioned bearings in engagement.

8. In a piston, the combination with a skirt having angularly spaced radially extending tubular bearings, each comprising a plurality of flexible sections, of a head having cooperating angularly spaced tubular bearings encircling and compressing said first mentioned tubular bearings and movably engaging the same.

9. In a piston, the combination with a skirt having angularly spaced radially extending tubular bearings, each comprising a plurality of flexible sections, of a head having cooperating angularly spaced cast tubular bearings encircling and compressing said first mentioned tubular bearings and movably engaging the same, and resilient means within said first mentioned tubular bearings for forcing said sections toward said second mentioned tubular bearings.

10. In a piston, the combination with a skirt having angularly spaced radially extending tubular bearings, each being longitudinally severed to form flexible tongues, of a head having cooperating angularly spaced cast tubular bearings encircling and compressing said first mentioned tubular bearings and movably engaging the same.

PHELPS M. FREER.